INVENTOR
Curtis C. Beusman

United States Patent Office 3,462,684
Patented Aug. 19, 1969

3,462,684
APPARATUS FOR DETECTING THE POSITION OF AN ELECTROCHEMICAL COULOMETER GAP
Curtis C. Beusman, Mount Kisco, N.Y., assignor to Curtis Instruments Inc., Mount Kisco, N.Y., a corporation of New York
Filed June 27, 1966, Ser. No. 560,522
Int. Cl. G01r 27/22, 11/00; H01h 29/00
U.S. Cl. 324—94                                    1 Claim

ABSTRACT OF THE DISCLOSURE

An electrochemical coulometer is shown having two liquid metal columns separated by a liquid electrolyte gap. When the device is energized by direct current one of the columns grows at the expense of the other, causing the electrolyte gap to change position. The present invention provides a sensing electrode within the body of the coulometer for penetrating and bridging the electrolyte gap when the gap has reached a predetermined position. In bridging the gap the sensing electrode short circuits the two liquid metal columns. An A.C. voltage source and an A.C. voltage detection means are connected across the columns of the coulometer to give an indication of the occurrence of the gap bridging.

---

Figure 1A:
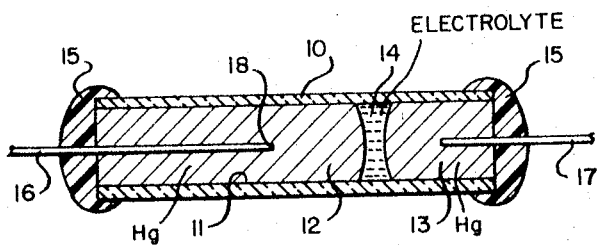

The present invention relates to electrochemical devices known as coulometers and more particularly to means for detecting a predetermined condition of a coulometer type device.

The United States Patent No. 3,045,178 issued to Lester Corrsin on July 17, 1962 and entitled "Operating Time Indicator" describes the theory of operation and construction of a coulometric device of which the present invention is an improvement. The instrument described in that patent includes a body of electrically non-conductive material having a bore therethrough which supports two columns of liquid metal (e.g., mercury), the adjacent inmost ends of which are separated by, but maintained in contact with a small volume of liquid electrolyte. The outermost ends of the two metal columns are maintained in contact with suitable conductive leads provided to connect the instrument to a source of electrical current. The flow of electrical current from one metal column to the other through the electrolyte causes metallic ions to migrate from the positive column (anode) to the negative column (cathode). In accordance with Faraday's law, liquid metal is electroplated from the anode column to the cathode column, causing the anode column to decrease in length and the cathode column to elongate correspondingly, the change in column length being directly proportional to the total electric charge passed through the device. When such a device is connected to a source of constant direct current readout of the measured time (or time-current product) may be effected by direct visual comparison of one column length against a calibrated scale.

In the operation of such a device, it is frequently desirable to detect electrically when a certain predetermined amount of electrical charge has been passed through the instrument, or, in other words, when the electrolyte gap separating the metal columns has reached a predetermined location. Several means for electrically detecting a particular electrolyte gap location in a coulometer device have been employed, but they have not been totally adequate for various reasons. In one arrangement a planar metal electrode is provided at the outermost end of one metal column. When the electrical current passing through the device has caused all the liquid metal to be deplated from the planar electrode the resistance of the coulometer increases sharply, but when very low level direct currents are involved (e. g., 0.1 microamp and lower) excellent high gain amplifiers are needed to detect the current change at this event. In another arrangement, a metal sensing electrode in contact with one of the metal columns extends into the bore of the coulometer for a distance. With the passage of current through the device, the electrolyte gap moves toward the sensing electrode which eventually penetrates, and finally bridges, the liquid electrolyte gap. This bridging or shorting-out of the electrolyte by the sensing electrode results in only a very small change in D.C. voltage across the coulometer (typically 1 millivolt or less), requiring sensitive detection apparatus.

The present invention provides a simple means for detecting a predetermined end-point or specific location of the electrolyte gap in a coulometric device of the type described requiring no elaborate or sensitive amplification. The invention also provides a means for modulating a relatively high-level A.C. voltage by means of a very low-level D.C. current.

According to the present invention, a coulometer device of the type generally described above provided with conductive sensing electrode means for penetrating and bridging the electrolyte gap at a predetermined position is energized by an electrical current source. A source of A.C. voltage is connected across the coulometer, and A.C. voltage detection means are provided to measure the A.C. voltage drop across the coulometer.

Figure 1B:
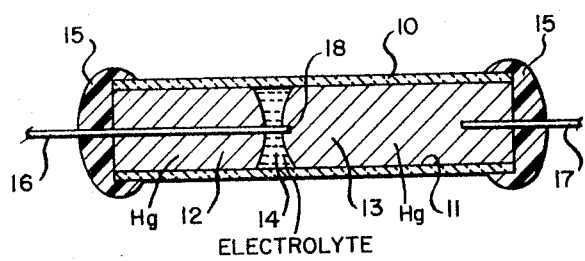
Figure 2:
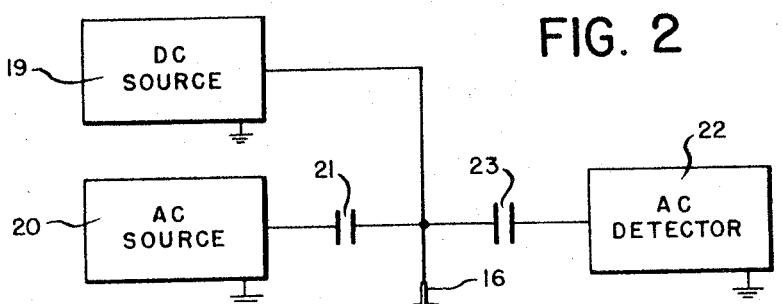
Figure 3:
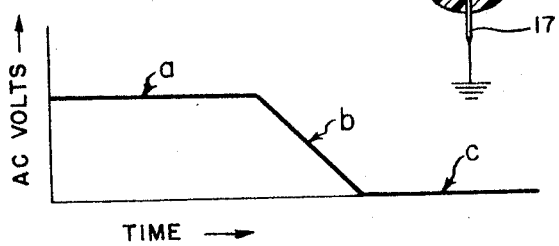

The invention will be more readily understood when the following description is read in connection with the accompanying drawing in which:

FIG. 1 (a) and (b) are two sectional views of a coulometer device for use with the present invention showing the electrolyte of the device in a normal and shorted-out condition, respectively;

FIG. 2 is a schematic diagram showing the device of FIG. 1 in the electrical arrangement of this invention; and FIG. 3 is a diagram showing the A.C. voltage drop across the device in the arrangement of FIG. 2 as a function of time.

The coulometer device shown in FIG. 1 has a tube 10 of non-conductive material such as glass, ceramic, or the like, with a cylindrical bore 11 therethrough. Two liquid metal columns 12 and 13 (e.g., mercury) are supported in the bore, extending inwardly from opposite ends of the tube and separated at the inmost ends by a gap or space filled by a small volume of liquid electrolyte 14 which is maintained in conductive contact with both columns. A suitable electrolyte may comprise a water solution of potassium iodide and mercuric iodide as described in the above-identified patent to Corrsin.

The bore 11 is sealed at both ends by epoxy resin seals 15 as shown. Two conductive leads 16 and 17, portions of which are immersed in the mercury columns, provide electrical contact with the columns. The conductive leads are preferably made of a metal such as nickel which does not chemically combine with mercury. The conductive lead 16, hereinafter called the sensing electrode has a thin, long tip 18 extending into the bore a distance such that it is capable of penetrating and shorting out the electrolyte gap 14 when the gap has reached a predetermined position.

When an external source of direct current is connected across the device of FIG. 1(a) so that the sensing electrode 16 is electrically positive and conductive lead 17 is electrically negative the flow of current through the device causes mercury to be electroplated from column 12 to column 13. The metal column 13 grows at the expense of column 12 and the electrolyte 14 moves toward the sensing electrode 16. (It should be noted that this process is completely reversible, and when the flow of current through the device is reversed, the movement of the electrolyte also changes direction.)

With the continued passage of current through the device the electrolyte 14 comes to occupy the position shown in FIG. 1(b) in which the sensing electrode tip 18 has completely bridged or shorted-out the electrolyte.

An intermediate condition of the coulometer, just prior to the shorting-out of the electrolyte, is shown in FIG. 2. In the device depicted there, low-level current (approximately 0.1 microamp) from a D.C. electrical source 19 connected across the coulometer leads 16 and 17 has caused the meniscus of mercury column 12 to recede past the tip 18 of the sensing electrode which has penetrated into the electrolyte 14 but has not bridged the gap between the columns. In the arrangement of FIG. 2 an A.C. voltage source 20 of approximately one volt amplitude is connected in series with a capacitor 21 across the coulometer. The capacitor prevents any D.C. component from the A.C. source 20 to be applied to the coulometer. An A.C. detector 22 is also connected in series with capacitor 23 across the coulometer to measure the A.C. voltage drop across the coulometer. Switch means (not shown) may be associated with the A.C. detector to be actuated when the detected A.C. signal falls below a predetermined level.

FIG. 3 at a, b, and c shows the A.C. voltage drop across the coulometer in the normal, intermediate and shorted-out stages of coulometer operation, respectively. When the coulometer is in a normal operating state such as that shown in FIG. 1(a) the A.C. voltage drop across the coulometer remains constant as indicated by a in FIG. 3. When the passage of the low-level D.C. current through the device causes the tip 18 of the sensing electrode to penetrate the liquid electrolyte 14 (as in FIG. 2) the A.C. voltage drop begins to decrease in a roughly linear fashion (region b of FIG. 3) until the device is completely shorted out and the A.C. drop goes to zero volts as at c in FIG. 3.

The present invention therefore provides a means for shorting out a relatively large A.C. signal (on the order of one volt) by the passage of a very small direct current (typically 0.1 microamp). By positioning the tip 18 of the sensing electrode at a predetermined position along the coulometer bore the movement of the electrolyte gap to that position may be sensed electrically without the necessity of having extremely sensitive detection apparatus.

Although the tip 18 of the sensing electrode is shown to be an integral part and extension of one of the conductive leads it can be physically and electrically separate from either conductive lead. It should be of conductive material of sufficient length and positioned in the bore so that it can penetrate and bridge the electrolyte gap at a predetermined position. The sensing electrode tip should be thin enough not to unduly elongate the electrolyte gap during the bridging process.

The A.C. source 20 of FIG. 2 may be the output of a radio transmitter or oscillator circuit which would be disabled when the coulometer shunting it is shorted-out. In such a situation no separate A.C. voltage detector would be required. The present invention may be used in any circuit where a shorted-out A.C. signal will enable (or disable) the circuit or where an A.C. detector can be used to perform the switching function.

What is claimed is:

1. Apparatus for detecting a coulometer gap position comprising: (a) a coulometer having a body of nonconductive material with a bore therein, two columns of liquid metal within said bore, each column extending from an end of said bore toward the other column such that a gap not occupied by column metal exists between the adjacent ends of the columns, a liquid electrolyte in said bore filling said gap and being in contact with the inmost ends of the columns, and solid conductive sensing electrode means within said bore for penetrating and bridging the gap at a predetermined position along the length of the bore; (b) a direct current source connected across the columns of the coulometer; (c) an A.C. voltage source connected across the columns of the coulometer; and (d) A.C. voltage detection means connected across the columns of the coulometer.

References Cited

UNITED STATES PATENTS

| | | | |
|---|---|---|---|
| 3,045,178 | 7/1962 | Corrsin | 324—94 X |
| 3,090,915 | 5/1963 | Soussloff et al. | 324—68 |
| 3,255,413 | 6/1966 | Marwell et al. | 324—94 |

RUDOLPH V. ROLINEC, Primary Examiner

C. F. ROBERTS, Assistant Examiner

U.S. Cl. X.R.

200—61.05; 307—2; 324—68